(12) United States Patent
Wang et al.

(10) Patent No.: US 10,517,118 B2
(45) Date of Patent: Dec. 24, 2019

(54) TRANSMISSION RESOURCE DETERMINING METHOD AND RELATED DEVICE

(71) Applicant: HUAWEI TECHNOLOGIES CO., LTD., Shenzhen (CN)

(72) Inventors: Da Wang, Beijing (CN); Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 54 days.

(21) Appl. No.: 15/744,060

(22) PCT Filed: Jul. 16, 2015

(86) PCT No.: PCT/CN2015/084195
§ 371 (c)(1),
(2) Date: Jan. 12, 2018

(87) PCT Pub. No.: WO2017/008291
PCT Pub. Date: Jan. 19, 2017

(65) Prior Publication Data
US 2018/0206073 A1    Jul. 19, 2018

Related U.S. Application Data

(63) Continuation of application No. PCT/CN2015/084195, filed on Jul. 16, 2015.

(51) Int. Cl.
*H04W 4/00* (2018.01)
*H04W 74/08* (2009.01)
(Continued)

(52) U.S. Cl.
CPC ....... *H04W 74/0816* (2013.01); *H04L 5/0053* (2013.01); *H04W 4/023* (2013.01);
(Continued)

(58) Field of Classification Search
CPC ... H04W 72/04; H04W 72/02; H04W 72/005; H04W 72/00
See application file for complete search history.

(56) References Cited

U.S. PATENT DOCUMENTS

2015/0009970 A1* 1/2015 Yu ..................... H04W 72/0446
370/336
2015/0245334 A1* 8/2015 Chang .................. H04W 76/14
370/329

FOREIGN PATENT DOCUMENTS

CN    103220814 A    7/2013
CN    103248640 A    8/2013
(Continued)

*Primary Examiner* — Omoniyi Obayanju
(74) *Attorney, Agent, or Firm* — Kilpatrick Townsend & Stockton LLP

(57) ABSTRACT

The present invention provides a transmission resource determining method and a related device. The method includes: receiving, by a first device, status information sent by all devices in a region; determining, by the first device, an idle resource in a resource pool according to a transmission pattern and resources in the resource pool that are used when all the devices in the region send the status information; and determining, by the first device according to a first rule, a first transmission resource from the idle resource as a resource for sending status information of the first device.

14 Claims, 9 Drawing Sheets

(51) Int. Cl.
*H04W 4/46* (2018.01)
*H04W 4/02* (2018.01)
*H04W 64/00* (2009.01)
*H04W 72/02* (2009.01)
*H04L 5/00* (2006.01)
*H04W 4/40* (2018.01)

(52) U.S. Cl.
CPC ............... *H04W 4/40* (2018.02); *H04W 4/46* (2018.02); *H04W 64/00* (2013.01); *H04W 72/02* (2013.01)

(56) References Cited

FOREIGN PATENT DOCUMENTS

| | | |
|---|---|---|
| CN | 104349280 A | 2/2015 |
| CN | 104581819 A | 4/2015 |
| WO | 2014173429 A1 | 10/2014 |

\* cited by examiner

After determining that a first device leaves a region and releases a first transmission resource, a second device sends status information of the second device by using the first transmission resource, where the first transmission resource is a transmission resource that is occupied when the first device sends status information of the first device, the second device is a device in the region that is not adjacent to a device using a blind area resource of the first transmission resource in terms of a physical location, and the blind area resource of the first transmission resource includes a transmission resource that corresponds to a same time domain as the first transmission resource ⟋ 201

FIG. 2-1

TRANSMISSION RESOURCE DETERMINING METHOD AND RELATED DEVICE

CROSS-REFERENCE TO RELATED APPLICATIONS

This application is a National Stage of International Application No. PCT/CN2015/084195, filed on Jul. 16, 2015, which is hereby incorporated by reference in its entirety.

TECHNICAL FIELD

The present invention relates to the field of wireless communications technologies, and in particular, to a transmission resource determining method and a related device.

BACKGROUND

In a vehicle to vehicle (V2V, Vechicle to Vechicle) communications system, any vehicle may exchange data with a surrounding vehicle in a broadcast or unicast manner. A device sends V2V information in the broadcast manner, so as to effectively transfer information and improve network flexibility. The V2V information is periodic broadcast information, and includes vehicle status information such as a device identifier, a device location, a speed, an acceleration, or a running route.

In the V2V communications system, after entering a region, a vehicle sends a periodic signal of the vehicle according to a transmission pattern, and receives a periodic signal sent by another vehicle, so that vehicles can find each other.

The vehicle in the V2V communications system may send or receive the periodic signal in the region by using the transmission pattern. However, in the prior art, a vehicle may randomly select a resource to send the periodic signal, and this cannot ensure that vehicles close to each other can find each other when the resource is selected. As a result, an occurrence probability of an accident is relatively high. In addition, if after all vehicles between two vehicles that cannot find each other leave the region, and the two vehicles still cannot find each other, it is very likely that an accident occurs.

SUMMARY

The present invention provides a transmission resource determining method and a related device, so as to reduce a probability that devices collide with each other.

A first aspect of the present invention provides a transmission resource determining method, and the method includes:

receiving, by a first device, status information sent by all devices in a region;

determining, by the first device, an idle resource in a resource pool according to a transmission pattern and resources in the resource pool that are used when all the devices in the region send the status information; and determining, by the first device according to a first rule, a first transmission resource from the idle resource as a resource for sending status information of the first device, where the first rule is that the first transmission resource is not a blind area resource of a second device, the second device is a device that is adjacent to the first device in terms of a physical location and that is in all the devices in the region, and the blind area resource of the second device includes a transmission resource that corresponds to a same time domain as a transmission resource used by the second device.

With reference to the first aspect, in a first possible implementation of the first aspect of the present invention, the first rule further includes:

in the region, the first device and a third device are separated by at least the second device, the third device is a device in the region that uses a blind area resource of the first device, and the blind area resource of the first device includes a transmission resource that corresponds to a same time domain as the first transmission resource.

With reference to the first possible implementation of the first aspect, in a second possible implementation of the first aspect of the present invention, that the third device is a device in the region that uses a blind area resource of the first device includes:

the third device is a device in the region that has a maximum physical distance from the first device.

With reference to the first or the second possible implementation of the first aspect, in a third possible implementation of the first aspect of the present invention, a blind area resource of the first transmission resource includes a first blind area resource and a second blind area resource, the third device uses the first blind area resource, a fourth device uses the second blind area resource, and the first rule further meets one of the following conditions:

both a first distance and a second distance are not less than a first threshold, the first distance is a physical distance between the first device and the third device, and the second distance is a physical distance between the first device and the fourth device, where optionally, the third device and the fourth device are respectively a device before the first device and a device after the first device in a moving direction; or both a first quantity and a second quantity are not less than a second threshold, the first quantity is a quantity of devices between the first device and the third device in the region, and the second quantity is a quantity of devices between the first device and the fourth device in the region, where optionally, the third device or the fourth device is a device before or after the first device in a moving direction.

With reference to any one of the first aspect, or the first to the third possible implementations of the first aspect, in a fourth possible implementation of the first aspect of the present invention, the receiving, by a first device, status information sent by all devices in a region, and the determining, by the first device, an idle resource in a resource pool according to a transmission pattern and resources in the resource pool that are used when all the devices in the region send the status information specifically include:

receiving, by the first device, the status information sent by all the devices in the region P times, and determining, by the first device, the idle resource according to the transmission pattern and the resource in the resource pool that is used when all the devices in the region send the status information P times, where P is a positive integer.

With reference to any one of the first aspect, or the first to the fourth possible implementations of the first aspect, in a fifth possible implementation of the first aspect of the present invention, after sending the status information of the first device according to the transmission pattern by using the first transmission resource, the first device determines a second transmission resource that is required for sending the status information next time, and the second transmission resource and the first transmission resource correspond to different time domains.

With reference to the fifth possible implementation of the first aspect, in a sixth possible implementation of the first aspect, the transmission pattern includes N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, where mod is a mod function, ceil is a ceiling function, floor is a floor function, and round is a rounding function.

A second aspect of the present invention provides a resource determining method, and the method includes:

sending, by a second device, status information of the second device by using a first transmission resource, after it is determined that a first device leaves a region and releases the first transmission resource, where the first transmission resource is a transmission resource that is used when the first device sends status information of the first device, the second device is a device in the region that is not adjacent to a device using a blind area resource of the first transmission resource in terms of a physical location, and the blind area resource of the first transmission resource includes a transmission resource that corresponds to a same time domain as the first transmission resource.

With reference to the second aspect, in a first possible implementation of the second aspect of the present invention, that the second device is a device in the region that is not adjacent to a device using a blind area resource of the first transmission resource in terms of a physical location includes:

in the region, the second device and the device using a blind area resource of the first transmission resource are separated by Q devices in terms of a physical location, where Q is a positive integer.

With reference to the second aspect, in a second possible implementation of the second aspect of the present invention, when the second device is the device using a blind area resource of the first transmission resource in the region, the sending, by a second device, status information of the second device by using a first transmission resource, after it is determined that a first device leaves a region and releases the first transmission resource includes:

when the second device determines, according to received status information of all devices except the second device in the region, that the first device leaves the region and releases the first transmission resource, sending, by the second device, the status information of the second device by using the first transmission resource; or when it is determined, according to status information that is of all devices except the second device in the region and that is received by a transmission module, that the first device leaves the region and releases the first transmission resource, skipping using the first transmission resource, so that a target device uses the first transmission resource, where the target device is a device to which an occupied transmission resource that is in a transmission pattern and that is adjacent to a location of a transmission resource used by the second device belongs, and the target device is a device that is not adjacent to the device using a blind area resource of the first transmission resource in terms of a physical location.

With reference to the second possible implementation of the second aspect, in a third possible implementation of the second aspect of the present invention, that the second device is the device using a blind area resource of the first transmission resource in the region includes:

the second device is a device that is in devices using a blind area resource of the first transmission resource and that is closest to a physical location of the first device; or the second device is a device to which a frequency domain resource that is first occupied according to an order of start locations of frequency domain resources in the transmission pattern belongs.

A third aspect of the present invention provides a first device, and the first device includes:

a transmission module, configured to receive status information sent by all devices in a region; and a processing module, configured to: determine an idle resource in a resource pool according to a transmission pattern and resources in the resource pool that are used when all the devices in the region send the status information, and determine, according to a first rule, a first transmission resource from the idle resource as a resource for sending status information of the first device, where the first rule is that the first transmission resource is not a blind area resource of a second device, the second device is a device that is adjacent to the first device in terms of a physical location and that is in all the devices in the region, and the blind area resource of the second device includes a transmission resource that corresponds to a same time domain as a transmission resource used by the second device.

With reference to the third aspect, in a first possible implementation of the third aspect of the present invention, the first rule further includes:

in the region, the first device and a third device are separated by at least the second device, the third device is a device in the region that uses a blind area resource of the first device, and the blind area resource of the first device includes a transmission resource that corresponds to a same time domain as the first transmission resource.

With reference to the first possible implementation of the third aspect, in a second possible implementation of the third aspect of the present invention, that the third device is a device in the region that uses a blind area resource of the first device includes:

the third device is a device in the region that has a maximum physical distance from the first device.

With reference to the first or the second possible implementation of the third aspect, in a third possible implementation of the third aspect of the present invention, a blind area resource of the first transmission resource includes a first blind area resource and a second blind area resource, the third device uses the first blind area resource, a fourth device uses the second blind area resource, and the first rule further meets one of the following conditions:

both a first distance and a second distance are not less than a first threshold, the first distance is a physical distance between the first device and the third device, and the second distance is a physical distance between the first device and the fourth device; or both a first quantity and a second quantity are not less than a second threshold, the first quantity is a quantity of devices between the first device and the third device in the region, and the second quantity is a quantity of devices between the first device and the fourth device in the region.

With reference to any one of the third aspect, or the first to the third possible implementations of the third aspect, in a fourth possible implementation of the third aspect, the transmission module is specifically configured to:

receive the status information sent by all the devices in the region P times; and the processing module is specifically configured to:

determine the idle resource according to the transmission pattern and the resource in the resource pool that is used when all the devices in the region send the status information P times, where P is a positive integer.

With reference to any one of the third aspect, or the first to the fourth possible implementations of the third aspect, in a fifth possible implementation of the third aspect, the processing module is further configured to:

after the transmission module sends the status information of the first device according to the transmission pattern by using the first transmission resource, determine a second transmission resource that is required for sending the status information next time, where the second transmission resource and the first transmission resource correspond to different time domains.

With reference to the fifth possible implementation of the third aspect, in a sixth possible implementation of the third aspect, the transmission pattern includes N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, where ceil is a ceiling function, floor is a floor function, and round is a rounding function.

A fourth aspect of the present invention provides a second device, and the second device includes:

a processing module, configured to enable the second device to send status information of the second device by using a first transmission resource, after it is determined that a first device leaves a region and releases the first transmission resource, where the first transmission resource is a transmission resource that is used when the first device sends status information of the first device, the second device is a device in the region that is not adjacent to a device using a blind area resource of the first transmission resource in terms of a physical location, and the blind area resource of the first transmission resource includes a transmission resource that corresponds to a same time domain as the first transmission resource.

With reference to the fourth aspect, in a first possible implementation of the fourth aspect of the present invention, that the second device is a device in the region that is not adjacent to a device using a blind area resource of the first transmission resource in terms of a physical location includes:

in the region, the second device and the device using a blind area resource of the first transmission resource are separated by Q devices in terms of a physical location, where Q is a positive integer.

With reference to the fourth aspect, in a second possible implementation of the fourth aspect, the second device further includes a transmission module, and when the second device is the device using a blind area resource of the first transmission resource in the region, the processing module is specifically configured to:

when determining, according to status information that is of all devices except the second device in the region and that is received by the transmission module, that the first device leaves the region and releases the first transmission resource, send the status information of the second device by using the first transmission resource; or when determining, according to status information that is of all devices except the second device in the region and that is received by the transmission module, that the first device leaves the region and releases the first transmission resource, skip using the first transmission resource, so that a target device uses the first transmission resource, where the target device is a device to which an occupied transmission resource that is in a transmission pattern and that is adjacent to a location of a transmission resource used by the second device belongs, and the target device is a device that is not adjacent to the device using a blind area resource of the first transmission resource in terms of a physical location.

With reference to the second possible implementation of the fourth aspect, in a third possible implementation of the fourth aspect of the present invention, that the second device is the device using a blind area resource of the first transmission resource in the region includes:

the second device is a device that is in devices using a blind area resource of the first transmission resource and that is closest to a physical location of the first device; or the second device is a device to which a frequency domain resource that is first occupied according to an order of start locations of frequency domain resources in the transmission pattern belongs.

In this embodiment of the present invention, after determining the idle resource according to the transmission pattern and the received status information, the first device determines the first transmission resource that is not the blind area resource of the second device in the idle resource. Therefore, it is ensured that after the first device enters the region, when the first device communicates with another device in the region, a physical distance between the first device and a blind area device of the first device falls beyond a fault distance, so as to effectively reduce a probability that devices collide with each other in a physical distance.

BRIEF DESCRIPTION OF DRAWINGS

FIG. 1-2 is a schematic diagram of a change of a location corresponding to a resource in a transmission pattern when a first device enters a region according to an embodiment of the present invention;

FIG. 1-3 is a schematic diagram of a change of a location corresponding to a resource in a transmission pattern according to an embodiment of the present invention;

FIG. 1-4 is a schematic flowchart of a transmission resource determining method according to an embodiment of the present invention;

FIG. 1-5 is another schematic structural diagram of a transmission pattern according to an embodiment of the present invention;

FIG. 1-6 is a schematic diagram showing that a first device determines, according to a location of a first device in an entered region, a location corresponding to a transmission resource in a transmission pattern according to an embodiment of the present invention;

FIG. 1-7 is another schematic diagram showing that a first device determines, according to a location of a first device in an entered region, a location corresponding to a transmission resource in a transmission pattern according to an embodiment of the present invention;

FIG. 2-1 is another schematic flowchart of a transmission resource determining method according to an embodiment of the present invention;

FIG. 2-2 is a schematic flowchart of a specific application scenario of a transmission resource determining method according to an embodiment of the present invention;

FIG. 3 is a schematic structural diagram of a first device according to an embodiment of the present invention;

FIG. 4 is a schematic structural diagram of a second device according to an embodiment of the present invention;

FIG. 4-1 is another schematic structural diagram of a second device according to an embodiment of the present invention;

FIG. 5 is another schematic structural diagram of a first device according to an embodiment of the present invention; and FIG. 6 is another schematic structural diagram of a second device according to an embodiment of the present invention.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments derived by persons skilled in the art based on the embodiments of the present invention shall fall within the protection scope of the present invention.

In the specification, claims, and accompanying drawings of the present invention, the terms "first", "second", and so on are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. In addition, the terms "include", "have", or any other variant thereof are intended to cover a non-exclusive inclusion. For example, a process, a method, a system, a product, or a device that includes a series of steps or modules is not necessarily limited to the steps or modules that are expressly listed, but may include another step or module not expressly listed or inherent to the process, the method, the product, or the device. The module division in this specification is merely logical division, and there may be another division during implementation in actual application. For example, multiple modules may be combined or integrated into another system, or some features may be ignored or not performed. In addition, the displayed or discussed mutual couplings or direct couplings or communication connections may be implemented through some interfaces. The indirect couplings or communication connections between the modules may be implemented in electronic or another form, and this is not limited in this specification. In addition, modules or sub-modules described as separate components may be or may not be physically separated, or may be or may not be physical modules, or may not be grouped into multiple circuit modules. Objectives of the solutions of the embodiments of the present invention may be achieved by selecting some or all of the modules according to actual requirements.

The embodiments of the present invention provide a transmission resource determining method and a related device, so as to reduce a probability that devices collide with each other. The device in this specification may be understood as any device moving in a region, such as a vehicle running in a lane, a flight device flying in the sky, or a ship steering in a navigation channel; or may be extended to a high-speed moving device similar to an orbiting satellite. A specific application scenario is not limited in this specification.

Figure 1:
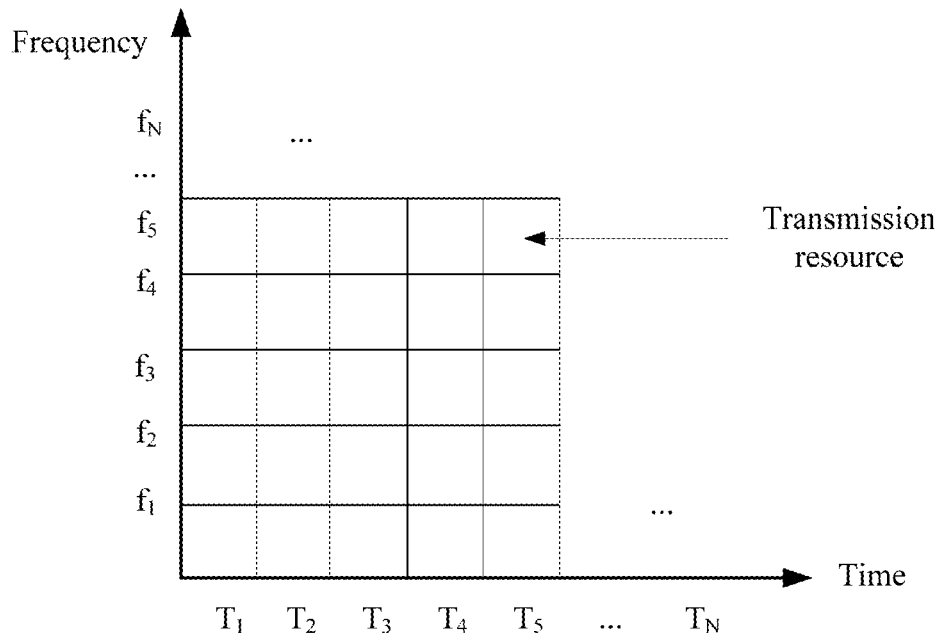
FIG. 1-1 is a schematic structural diagram of a transmission pattern according to an embodiment of the present invention.

In this specification, a device after entering a region may determine a required transmission resource according to a transmission pattern, so as to send or receive information. The transmission pattern is used to instruct the device after entering the region, to determine a transmission resource from a pre-configured resource pool, to communicate with another device in the region or outside the region. Each unit in the transmission pattern corresponds to a transmission resource in a resource pool. As shown in FIG. 1-1, the transmission pattern includes a time axis and a frequency axis. A smallest unit in the transmission pattern that is formed by a component value of the time axis and a component value of the frequency axis corresponds to a transmission resource. The time axis includes N time points ($T_1$, $T_2$, . . . , and $T_N$), and the frequency axis includes N frequency points ($f_1$, $f_2$, . . . , and $f_N$). Each pair of coordinates ($T_x$, $f_y$) in the transmission pattern corresponds to a transmission resource. The smallest unit in the transmission resource is a physical resource block (PRB, Physical Resource Block). The transmission resource uses 12 consecutive subcarriers in a frequency domain, and uses one timeslot in the time domain, and a length of a timeslot is 0.5 ms. The transmission resource may include multiple PRBs, for example, may include two PRBs, and therefore, the transmission resource uses 12 consecutive subcarriers in the frequency domain, and uses one subframe in the time domain, and a length of a subframe is 1 ms.

In addition, the transmission pattern specifies a rule for determining a transmission resource when a device continuously sends status information of the device multiple times. For example, when sending the status information of the device, the device selects a transmission resource that is indicated by a first unit in the transmission pattern, to send the status information of the device; and when sending the status information of the device next time or another time, the device needs to select, according to the rule of the transmission pattern, a transmission resource that is indicated by a second unit corresponding to the first unit in the transmission pattern, to send the status information of the device. The specific rule may be formulated according to an actual condition (for example, in a specific time, road condition information, a service volume, a quantity of devices that enter the region, or an actual capacity of the resource pool). This is not limited in this specification.

Figures 1, 2:
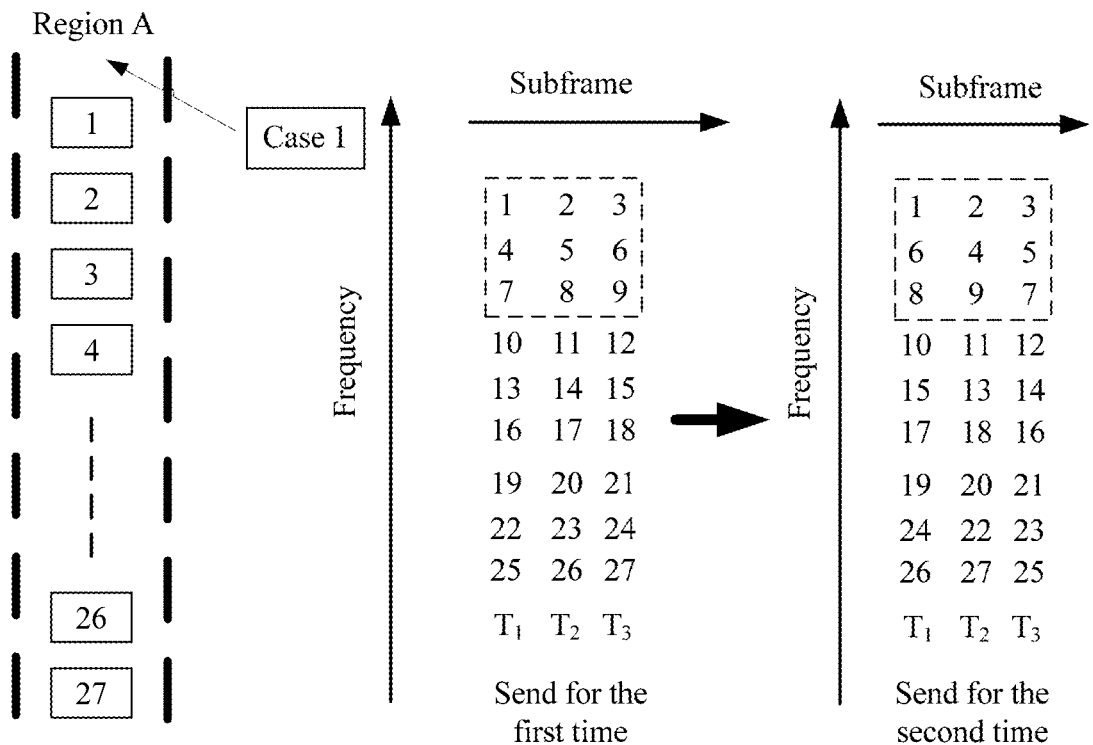

For example, according to a quantity N of time domain resource locations corresponding to a transmission pattern to which each region belongs, the transmission pattern to which each region belongs is divided into an N×N smallest resource group. For example, in FIG. 1-2, a transmission pattern to which a region A belongs corresponds to three resource locations in the time domain, and a smallest resource group of the transmission pattern to which each region belongs is a matrix including 3×3 resource locations (as shown in a dashed square box in FIG. 1-2). A number in FIG. 1-2 represents an identify (ID, Identify) of a vehicle. Transmission resources between which there is a smallest resource group correspond to a same rule in a frequency direction in the transmission pattern to which each region belongs. For example, a rule corresponding to a location A is the same as a rule corresponding to a location B, where the location A is a location of an ID 1 in a first resource group (including IDs 1, 2, 3, 4, 5, 6, 7, 8, and 9) in the transmission pattern, and the location B is a location of an ID 10 in a second resource group (including IDs 10, 11, 12, 13, 14, 15, 16, 17, and 18) in the transmission pattern, and so on. Details are not described.

Figures 1, 2, 3:
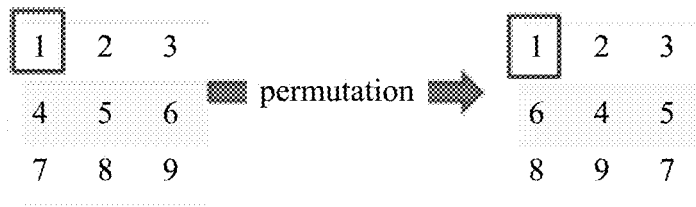

For another example, in FIG. 1-3, each number represents a location that corresponds to a transmission resource used by different device and that is in the transmission pattern. For example, when sending status information of devices 1, 4, and 7, the devices 1, 4, and 7 use a same subframe but different frequencies. In this case, the device 1, the device 4, and the device 7 cannot receive status information broadcast by each other, that is, the three devices cannot find each other. After sending the status information multiple times (at least twice), the device 1, the device 4, and the device 7 select different subframes to send status information of the device 1, the device 4, and the device 7. Therefore, the device 1, the device 4, and the device 7 can receive the status information broadcast by each other.

Referring to FIG. 1-4, the following describes how to determine a transmission resource after a device enters a region. A transmission resource determining method in an embodiment of the present invention includes:

101. A first device receives status information sent by all devices in a region.

It may be understood that before entering the region, the first device may receive status information that is periodically sent by all the devices in the region. The status information may include location information of a device, a device identifier, a moving speed, an acceleration, a moving direction, a possible running route, or the like.

102. The first device determines an idle resource in a resource pool according to a transmission pattern and resources in the resource pool that are used when all the devices in the region send the status information.

103. The first device determines, according to a first rule, a first transmission resource from the idle resource as a resource for sending status information of the first device.

The first rule is that the first transmission resource is not a blind area resource of a second device. The second device is a device that is adjacent to the first device in terms of a physical location and that is in all the devices in the region. The blind area resource of the second device includes a transmission resource that corresponds to a same time domain as a transmission resource used by the second device.

In this embodiment of the present invention, after determining the idle resource according to the transmission pattern and the received status information, the first device determines the first transmission resource that is not the blind area resource of the second device in the idle resource. Therefore, it is ensured that after the first device enters the region, when the first device communicates with another device in the region, a physical distance between the first device and a blind area device of the first device falls beyond a fault distance, so as to effectively reduce a probability that devices collide with each other in a physical distance.

In some embodiments, based on the embodiment corresponding to FIG. 1-4, in a first optional embodiment of the embodiments of the present invention, the first rule further includes:

in the region, the first device and a third device are separated by at least the second device, the third device is a device in the region that uses a blind area resource of the first device, and the blind area resource of the first device includes a transmission resource that corresponds to a same time domain as the first transmission resource.

In an actual application, the first rule may specifically include:

in the service region, a quantity of devices between the third device and the first device is greater than a preset threshold, or the third device is a device that is in the service region and that has a maximum physical distance from the first device in terms of a physical location.

For example, as shown in FIG. 1-2, there are 27 devices in a region A in total. In a first case (as shown in a case 1 in the figure), if the first device is in front of a device with an ID 1 (that is, a second device), the first device cannot select a blind area resource of the device with the ID 1 as the first transmission resource. As shown in a transmission pattern in FIG. 1-1, it can be learned that the blind area resource of the device with the ID 1 is included in the transmission pattern. A transmission resource used by a device with an ID 10, 19, 28, or the like is a transmission resource of a location corresponding to each 3×3 resource group in the resource pool. Therefore, in terms of a physical location, it can be ensured that the first device does not collide with the third device within a time period (when the second device does not leave the region) provided that the first device and the third device are separated by at least the second device. Certainly, when the third device is the device (a device with an ID 27) that is in the service region and that has a maximum physical distance from the first device in terms of a physical location, and a blind area resource of the device with the ID 27 is not occupied, the first device may preferentially select the blind area resource of the device with the ID 27 as the first transmission resource.

Optionally, based on the first optional embodiment, in a second optional embodiment of the embodiments of the present invention, that the third device is a device in the region that uses a blind area resource of the first device includes:

the third device is a device in the region that has a maximum physical distance from the first device.

Optionally, based on the first or the second optional embodiment, in a third optional embodiment of the embodiments of the present invention, a blind area resource of the first transmission resource includes a first blind area resource and a second blind area resource, the third device uses the first blind area resource, a fourth device uses the second blind area resource, and the first rule further meets one of the following conditions:

1. Both a first distance and a second distance are not less than a first threshold, the first distance is a physical distance between the first device and the third device, and the second distance is a physical distance between the first device and the fourth device.

In this case, two or more thresholds may be defined. For example, it is defined that the first distance is not less than a threshold a, the second distance is not less than a threshold b, and the threshold a may be the same as or different from the threshold b. This is set according to an actual road condition, and is not specifically limited in this specification.

In an actual application, for example, when a device is a vehicle, the vehicle runs in a lane. Because lanes are designed differently from place to place, there may be a single-lane, dual-lane, or the like. For example, in a single-lane, a distance between the vehicle and each of a vehicle before the vehicle and a vehicle after the vehicle in a driving direction of the vehicle may be directly calculated to determine whether the distance is greater than the first threshold, so as to ensure a minimum safe range; in the multi-lane, a distance between the vehicle and each of all vehicles surrounding the vehicle may need to be calculated to determine whether the distance is greater than the first threshold.

2. Both a first quantity and a second quantity are not less than a second threshold, the first quantity is a quantity of devices between the first device and the third device in the region, and the second quantity is a quantity of devices between the first device and the fourth device in the region.

In this case, two or more thresholds may be defined. For example, it is defined that the first distance is not less than a threshold c, the second distance is not less than a threshold d, and the threshold c may be the same as or different from the threshold d. This is set according to an actual road condition, and is not specifically limited in this specification.

In an actual application, the vehicle runs in a lane. Because lanes are designed differently from place to place, there may be a single-lane, dual-lane, or the like. For example, in the single-lane, a quantity of vehicles before the vehicle and a quantity of vehicles after the vehicle in a driving direction may be directly calculated to determine whether each of the two quantities is greater than the second threshold, so as to ensure a minimum safe range; in the multi-lane, a quantity of vehicles that are between the vehicle and each of all vehicles surrounding the vehicle and that meet a condition of the third device or the fourth device may need to be calculated to determined whether the quantity is greater than the second threshold.

Optionally, based on the embodiment corresponding to FIG. 1-4, or based on any one of the first to the third optional embodiments, in a fourth optional embodiment of the embodiments of the present invention, that a first device receives status information sent by all devices in a region, and the first device determines an idle resource in a resource pool according to a transmission pattern and resources in the resource pool that are used when all the devices in the region send the status information specifically include:

receiving, by the first device, the status information sent by all the devices in the region P times, and determining, by the first device, the idle resource according to the transmission pattern and the resource in the resource pool that is used when all the devices in the region send the status information P times, where P is a positive integer.

According to a transmission pattern in the current technical field, each device needs to send status information of the device multiple times, to improve a probability of being found and a probability of finding another device. A first device to enter the region may determine an idle resource according to a result obtained after another device sends status information multiple times, to ensure accuracy of determining a transmission resource, and avoid a conflict with another device in selecting a transmission resource.

Optionally, based on the embodiment corresponding to FIG. 1-4, or based on any one of the first to the fourth optional embodiments, in a fifth optional embodiment of the embodiments of the present invention, after sending the status information of the first device according to the transmission pattern by using the first transmission resource, the first device determines a second transmission resource that is required for sending the status information next time, and the second transmission resource and the first transmission resource correspond to different time domains.

Optionally, based on the fifth optional embodiment, in a sixth optional embodiment of the embodiments of the present invention, as shown in FIG. 1-5, the transmission pattern includes N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, where ceil is a ceiling function, floor is a floor function, and round is a rounding function.

For ease of understanding, the following describes in detail a transmission resource determining method in the embodiments of the present invention by using a specific application scenario. Referring to FIG. 1-6, for example, a vehicle runs in a lane. A lane forms a region. There is a lane A (forming a region A), and nine vehicles are set to run in the lane A. Numbers 1, 2, . . . , and 9 in FIG. 1-6 represent IDs of vehicles. In the lane A, when some vehicles continuously send periodic signals multiple times, transmission resources used by the vehicles correspond to a same time domain location in the transmission pattern. As a result, the vehicles cannot receive a periodic signal sent by each other, that is, these vehicles are blind to each other.

It can be learned from FIG. 1-6 that when a target vehicle is at a physical location shown in a case 1 or a case 2, the target vehicle has a maximum physical distance from a vehicle with an ID 9. Therefore, an optimal transmission resource selected by the target vehicle corresponds to an $X_1$ location shown in a transmission pattern, that is, a transmission resource used by the vehicle with the ID 9 and the transmission resource selected by the target vehicle are blind to each other (corresponding to a same subframe $T_3$). The target vehicle may preferably select a transmission resource corresponding to the $X_1$ location shown in the figure, or may select all resources except a transmission resource corresponding to a shown $Y_1$ location ($Y_1$ may represent all locations that have a same resource selection rule as a vehicle with an ID 1). The location corresponding to an ID 9 in the transmission pattern has a same resource selection rule as the location corresponding to the ID $X_1$. Therefore, the ID 9 and the ID $X_1$ are in a same subframe, that is, the ID 9 and the ID $X_1$ are blind to each other.

Likewise, when a target vehicle is at a physical location shown in a case 3 or a case 4, the target vehicle has a maximum physical distance from the vehicle with the ID 1. Therefore, an optimal transmission resource selected by the target vehicle corresponds to an $X_2$ location shown in the transmission pattern, that is, a transmission resource used by the vehicle with the ID 1 and the transmission resource selected by the target vehicle are blind to each other (corresponding to a same subframe $T_1$). The target vehicle may preferably select a transmission resource corresponding to the $X_2$ location shown in the figure, or may select all resources except a transmission resource corresponding to a shown $Y_2$ location ($Y_2$ may represent all locations that have a same resource selection rule as a vehicle with an ID 9). The location corresponding to an ID 1 in the transmission pattern has a same resource selection rule as the location corresponding to the ID $X_2$. Therefore, the ID 1 and the ID $X_2$ are in a same subframe, that is, the ID 1 and the ID $X_2$ are blind to each other. A case of another physical location is similar to the foregoing. How a target vehicle selects a transmission resource is not described in detail again.

For another example, in FIG. 1-6, the $X_1$ location in the figure is a preferred transmission resource location. As shown in FIG. 1-7, when the target car is at the case 1, if the $X_1$ location (that is, a vehicle with an ID 18) is used by another device, the target vehicle may select a corresponding available transmission resource in a descending order of physical distances from the target vehicle. If an $X_3$ location shown in FIG. 1-7 is not occupied, the target vehicle preferably selects the shown $X_3$ location. The case 2, the case 3, and the case 4 are similar. Details are not described again.

Certainly, in FIG. 1-6 or FIG. 1-7, the transmission pattern is divided only by using a lane as a region. Another division method is not specifically limited in this specification. In addition, in FIG. 1-6 or FIG. 1-7, vehicles in a region use transmission resources in an order. In an actual application, there may be multiple regions, and cases of the multiple regions may be correspondingly extended. Details are not described in this specification.

Referring to FIG. 2-1, the following describes a transmission resource determining method in the embodiments of the present invention from a perspective of how to use a resource that is released by a device after the device in a region leaves the region. The method includes:

201. After determining that a first device leaves a region and releases a first transmission resource, a second device sends status information of the second device by using the first transmission resource.

The first transmission resource is a transmission resource that is used when the first device sends status information of the first device. The second device is a device in the region that is not adjacent to a device using a blind area resource of the first transmission resource in terms of a physical location. The blind area resource of the first transmission resource includes a transmission resource that corresponds to a same time domain as the first transmission resource.

In this embodiment of the present invention, a rule of determining a to-be-released resource is pre-configured. Therefore, after determining that the first device leaves the region and releases the first transmission resource, the second device may send the status information of the second device by using the first transmission resource, and change a current resource according to the rule of determining a to-be-released resource, so as to avoid a problem that after all devices between devices that are blind to each other leave the region, the devices still cannot find each other even through a physical distance between the devices is small, and therefore collide with each other. In addition, an idle resource is fully used to reduce a collision probability.

Optionally, based on the embodiment corresponding to FIG. 2-1, in a first optional embodiment of the embodiments of the present invention, that the second device is a device in the region that is not adjacent to a device using a blind area resource of the first transmission resource in terms of a physical location includes:

in the region, the second device and the device using a blind area resource of the first transmission resource are separated by Q devices in terms of a physical location, where Q is a positive integer.

For example, in the region, a quantity of devices in a first direction of a moving direction of the first device is not less than a first threshold, and a quantity of devices in a second direction of the moving direction of the first device is not less than a second threshold.

Optionally, based on the first optional embodiment, in a second optional embodiment of the embodiments of the present invention, when the second device is the device using a blind area resource of the first transmission resource in the region, and that after determining that a first device leaves a region and releases a first transmission resource, a second device sends status information of the second device by using the first transmission resource includes:

when the second device determines, according to received status information of all devices except the second device in the region, that the first device leaves the region and releases the first transmission resource, sending, by the second device, the status information of the second device by using the first transmission resource; or when the second device determines, according to received status information of all devices except the second device in the region, that the first device leaves the region and releases the first transmission resource, skipping using, by the second device, the first transmission resource, so that a target device uses the first transmission resource, where the target device is a device to which an occupied transmission resource that is in a transmission pattern and that is adjacent to a location of a transmission resource used by the second device belongs, and the target device is a device that is not adjacent to the device using a blind area resource of the first transmission resource in terms of a physical location.

Optionally, based on the second optional embodiment, in a third optional embodiment of the embodiments of the present invention, that the second device is the device using a blind area resource of the first transmission resource in the region includes:

the second device is a device that is in devices using a blind area resource of the first transmission resource and that is closest to a physical location of the first device; or the second device is a device to which a frequency domain resource that is first occupied according to an order of start locations of frequency domain resources in the transmission pattern belongs, where it can be learned that a device to which a frequency domain resource that is closest to a frequency domain location of the first transmission resource in the transmission pattern belongs is a preferred second device, and if the frequency domain resource is not occupied, a device to which a next occupied frequency domain resource belongs is used as a preferred second device according to the order.

Resource locations may be divided into a first group, a second group, ..., $N^{th}$ group, and the like in advance. For example, the first group is a set of N×N resource locations from a start location of a frequency resource. The first group, the second group, ..., and the $N^{th}$ group are arranged from left to right in an ascending order of start locations of the frequency domain resources. If a resource X in the first group is released, a device to which a first occupied resource in the second group belongs uses the resource X. If the device to which a first occupied resource in the second group belongs is a device that is adjacent to a device using a blind area resource of the first transmission resource in terms of a physical location, a device to which a second occupied resource in the second group belongs uses the resource X. By analogy, if no resource is occupied in the second group or no device meets the condition, a device in a third group uses the resource X.

For example, it is assumed that a transmission resource used by the second device corresponds to a frequency domain location A in a transmission pattern, and the first transmission resource corresponds to a frequency domain location B (in the second group) in the transmission pattern. There are two main cases about the second device:

1. According to an ascending order of start locations of the frequency domain resources in the transmission pattern, the second device is a device to which a frequency domain resource that is first occupied in the third group according to the order belongs; and 2. According to a descending order of start locations of the frequency domain resources in the transmission pattern, the second device is a device to which a frequency domain resource that is first occupied in the first group according to the order belongs.

Optionally, based on the embodiment corresponding to FIG. 2-1, in a fourth optional embodiment of the embodiments of the present invention, the second device is a blind area device that uses a same time domain resource as the first device and whose physical location distance from the first device in the region is less than a third threshold; or the second device is a blind area device that uses a same time domain resource as the first device, and a quantity of devices between the first device and the second device in the region is less than a fourth threshold.

For ease of understanding, the following describes in detail a transmission resource determining method in the embodiments of the present invention by using a specific application scenario. Referring to FIG. 2-2, for example, a vehicle runs in a lane lane. A lane forms a region. There is a lane lane A (forming a region A), and 21 vehicles are set to run in the lane A. Numbers 1, 2, . . . , and 21 in FIG. 2-2 represent IDs of vehicles. In the lane A, when some vehicles continuously send periodic signals multiple times, transmission resources used by the vehicles correspond to a same time domain location in the transmission pattern. As a result, the vehicles cannot receive a periodic signal sent by each other, that is, these vehicles are blind to each other. For example, a vehicle with an ID 1 and a vehicle with an ID 10 are blind to each other, and cannot find each other.

It can be learned from FIG. 2-2 that after a vehicle with an ID 2 leaves a region A and releases a first transmission resource used by the vehicle, because a vehicle with an ID 2 and a vehicle with an ID 11 or 20 are blind to each other, a target vehicle that uses the first transmission resource next time cannot be adjacent to the vehicle with the ID 11 or 20 in terms of a physical location, that is, the target vehicle cannot be a vehicle with an ID 10 or 12; or with an ID 19 or 21.

There are the following main cases about the target vehicle selected in this embodiment:

1. The target vehicle is the vehicle with the ID 11 or 20.
2. The target vehicle is the vehicle with the ID 11. In this case, the target vehicle is a vehicle whose physical location is closest to the vehicle with the ID 2 in all blind area vehicles of the vehicle with the ID 2.

Certainly, the target vehicle may be further a vehicle whose ID is not 10 or 12. A use priority or a policy may be specifically set according to an actual application. This is not limited in this specification.

From a perspective in which a device that is to enter a region determines a transmission resource, the following describes a first device 30 that executes the transmission resource determining method. Referring to FIG. 3, the first device 30 includes:

a transmission module 301, configured to receive status information sent by all devices in a region; and a processing module 302, configured to: determine an idle resource in a resource pool according to a transmission pattern and resources in the resource pool that are used when all the devices in the region send the status information, and determine, according to a first rule, a first transmission resource from the idle resource as a resource for sending status information of the first device, where the first rule is that the first transmission resource is not a blind area resource of a second device, the second device is a device that is adjacent to the first device in terms of a physical location and that is in all the devices in the region, and the blind area resource of the second device includes a transmission resource that corresponds to a same time domain as a transmission resource used by the second device.

In this embodiment of the present invention, after determining the idle resource according to the transmission pattern and the received status information, the processing module 302 determines the first transmission resource that is not the blind area resource of the second device from the idle resource. Therefore, it is ensured that after the first device enters the region, when the first device communicates with another device in the region, a physical distance between the first device and a blind area device of the first device falls beyond a fault distance, so as to effectively reduce a probability that devices collide with each other in a physical distance.

Optionally, based on the embodiment corresponding to FIG. 3, in a first optional embodiment of the embodiments of the present invention, the first rule further includes:

in the region, the first device and a third device are separated by at least the second device, the third device is a device in the region that uses a blind area resource of the first device, and the blind area resource of the first device includes a transmission resource that corresponds to a same time domain as the first transmission resource.

Optionally, based on the first optional embodiment, in a second optional embodiment of the embodiments of the present invention, that the third device is a device in the region that uses a blind area resource of the first device includes:

the third device is a device in the region that has a maximum physical distance from the first device.

Optionally, based on the first or the second optional embodiment, in a third optional embodiment of the embodiments of the present invention, a blind area resource of the first transmission resource includes a first blind area resource and a second blind area resource, the third device uses the first blind area resource, a fourth device uses the second blind area resource, and the first rule further meets one of the following conditions:

both a first distance and a second distance are not less than a first threshold, the first distance is a physical distance between the first device and the third device, and the second distance is a physical distance between the first device and the fourth device; or both a first quantity and a second quantity are not less than a second threshold, the first quantity is a quantity of devices between the first device and the third device in the region, and the second quantity is a quantity of devices between the first device and the fourth device in the region.

Optionally, based on any optional embodiment of the first to the third optional embodiments, in a fourth optional embodiment of the embodiments of the present invention, the transmission module 301 is specifically configured to:

receive the status information sent by all the devices in the region P times; and the processing module 302 is specifically configured to:

determine the idle resource according to the transmission pattern and the resource in the resource pool that is used when all the devices in the region send the status information P times, where P is a positive integer.

Optionally, based on any optional embodiment of the first to the fourth optional embodiments, in a fifth optional embodiment of the embodiments of the present invention, the processing module 302 is further configured to:

after the transmission module 301 sends the status information of the first device according to the transmission pattern by using the first transmission resource, determine a second transmission resource that is required for sending the status information next time, where the second transmission resource and the first transmission resource correspond to different time domains.

Optionally, based on the fifth optional embodiment, in a sixth optional embodiment of the embodiments of the present invention, the transmission pattern includes N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, where ceil is a ceiling function, floor is a floor function, and round is a rounding function.

Figures 1, 2, 3, 4:
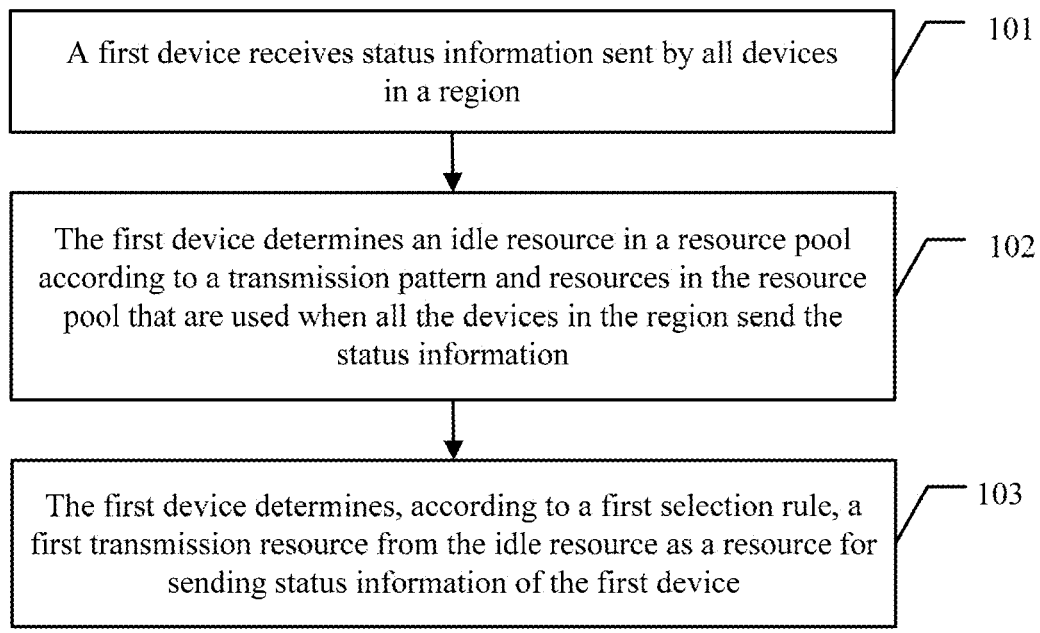

Referring to FIG. 4, the following describes a second device 40 in this embodiment of the present invention by using an example from a perspective in which a device uses a released idle resource in a region. The second device 40 includes:

a processing module 401, configured to enable the second device to send status information of the second device by using a first transmission resource, after it is determined that a first device leaves a region and releases the first transmission resource, where the first transmission resource is a transmission resource that is used when the first device sends status information of the first device, the second device is a device in the region that is not adjacent to a device using a blind area resource of the first transmission resource in terms of a physical location, and the blind area resource of the first transmission resource includes a transmission resource that corresponds to a same time domain as the first transmission resource.

In this embodiment of the present invention, a rule of determining a to-be-released resource is pre-configured. Therefore, after determining that the first device leaves the region and releases the first transmission resource, the second device may send the status information of the second device by using the first transmission resource, and change a current resource by using the processing module 401 according to the rule of determining a to-be-released resource, so as to avoid a problem that after all devices between devices that are blind to each other leave the region, the devices still cannot find each other even through a physical distance between the devices is small, and therefore collide with each other. In addition, an idle resource is fully used to reduce a collision probability.

Optionally, based on the embodiment corresponding to FIG. 4, in a first optional embodiment of the embodiments of the present invention, that the second device is a device in the region that is not adjacent to a device using a blind area resource of the first transmission resource in terms of a physical location includes:

in the region, the second device and the device using a blind area resource of the first transmission resource are separated by Q devices in terms of a physical location, where Q is a positive integer.

Optionally, based on the embodiment corresponding to FIG. 4, in a second optional embodiment of the embodiments of the present invention, referring to FIG. 4-1, the second device further includes a transmission module 402, and when the second device is the device using a blind area resource of the first transmission resource in the region, the processing module 401 is specifically configured to:

when determining, according to status information that is of all devices except the second device in the region and that is received by the transmission module 402, that the first device leaves the region and releases the first transmission resource, send the status information of the second device by using the first transmission resource; or when determining, according to status information that is of all devices except the second device in the region and that is received by the transmission module 402, that the first device leaves the region and releases the first transmission resource, skip using the first transmission resource, so that a target device uses the first transmission resource, where the target device is a device to which an occupied transmission resource that is in a transmission pattern and that is adjacent to a location of a transmission resource used by the second device belongs, and the target device is a device that is not adjacent to the device using a blind area resource of the first transmission resource in terms of a physical location.

Optionally, based on the second optional embodiment, in a third optional embodiment of the embodiments of the present invention, that the second device is the device using a blind area resource of the first transmission resource in the region includes:

the second device is a device that is in devices using a blind area resource of the first transmission resource and that is closest to a physical location of the first device; or the second device is a device to which a frequency domain resource that is first occupied according to an order of start locations of frequency domain resources in the transmission pattern belongs.

The present invention further provides a computer storage medium, the medium stores a program. When the program is executed, some or all of the steps in the transmission resource determining method are included.

The present invention further provides a computer storage medium. The medium stores a program. When the program is executed, some or all of the steps in the transmission resource determining method that is executed by the first device or the second device are included.

Figures 1, 2, 3, 4, 5:
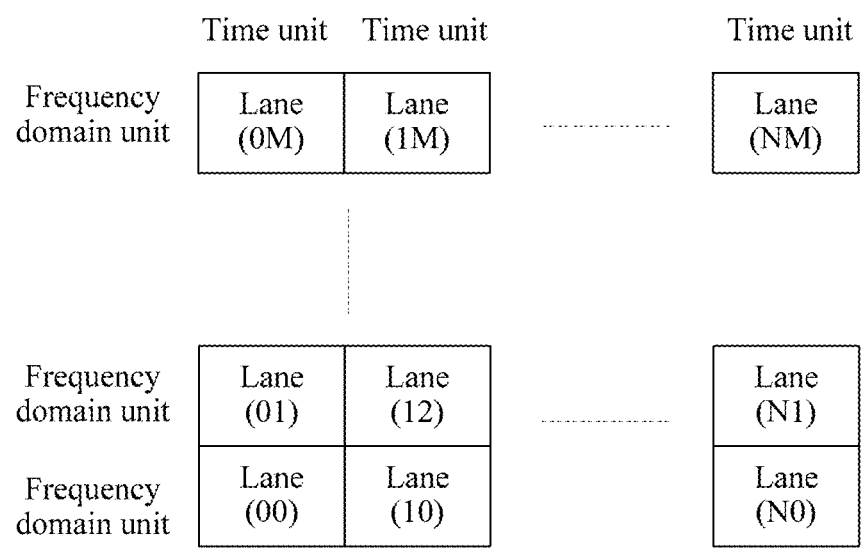
Figures 1, 2, 3, 4, 5, 6:
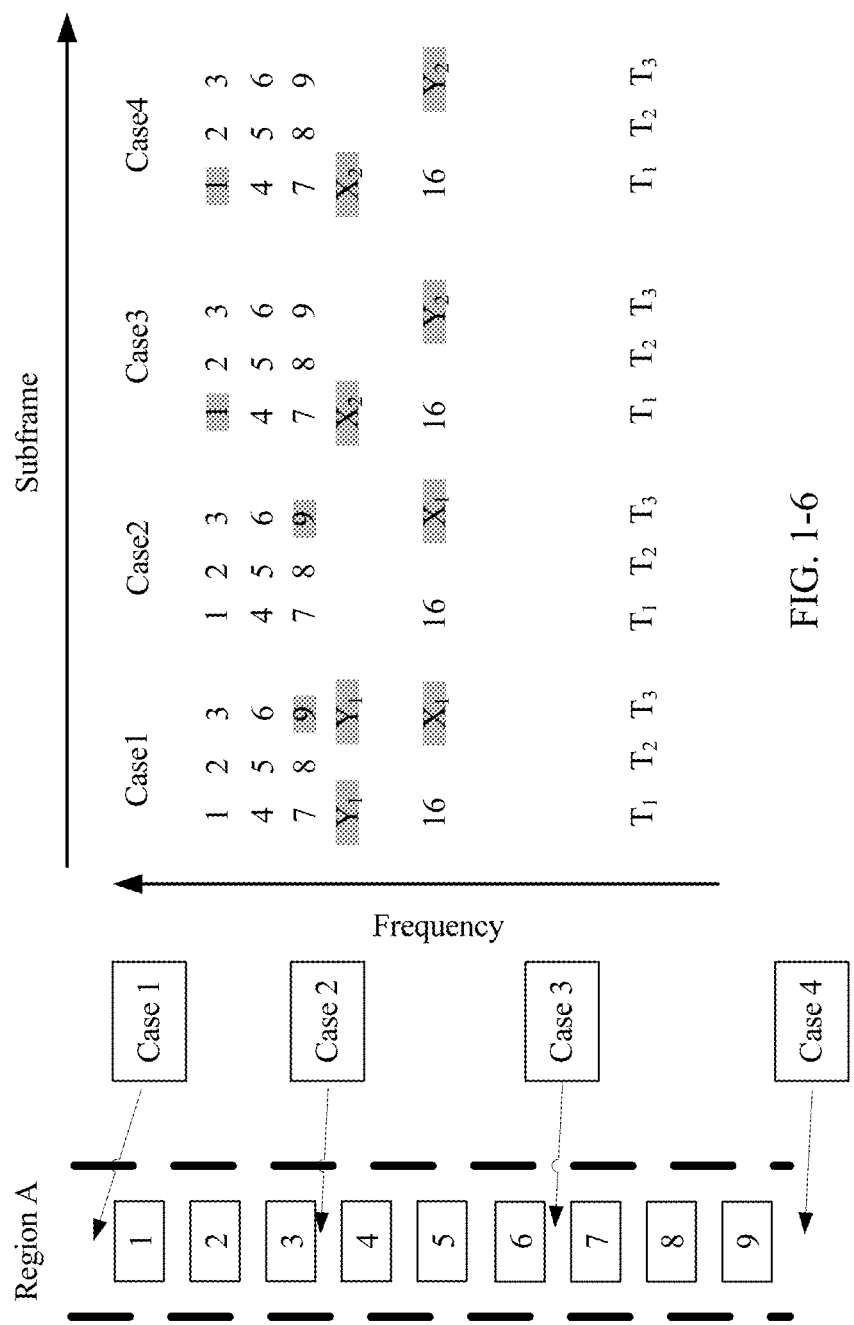
Figures 1, 2, 3, 4, 5, 6, 7:
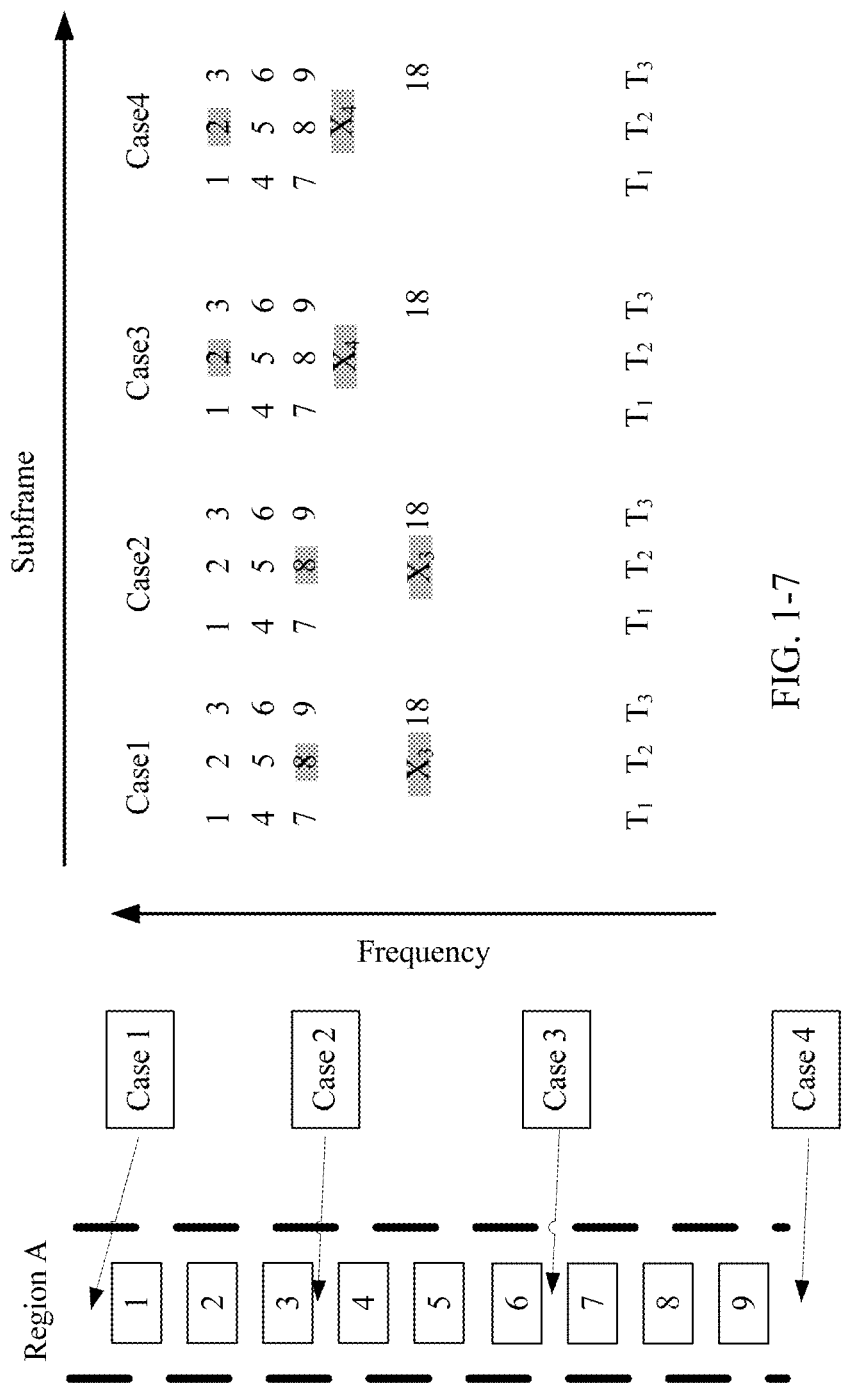
Figure 2:
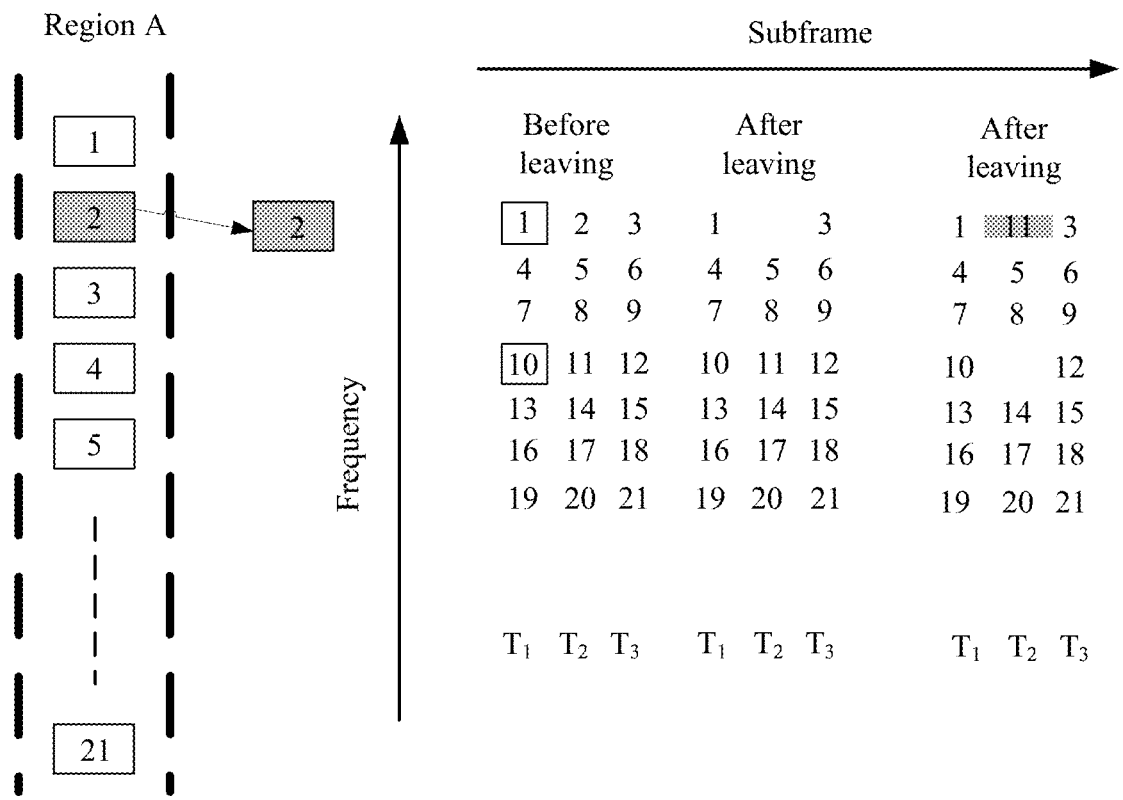
Figure 3:
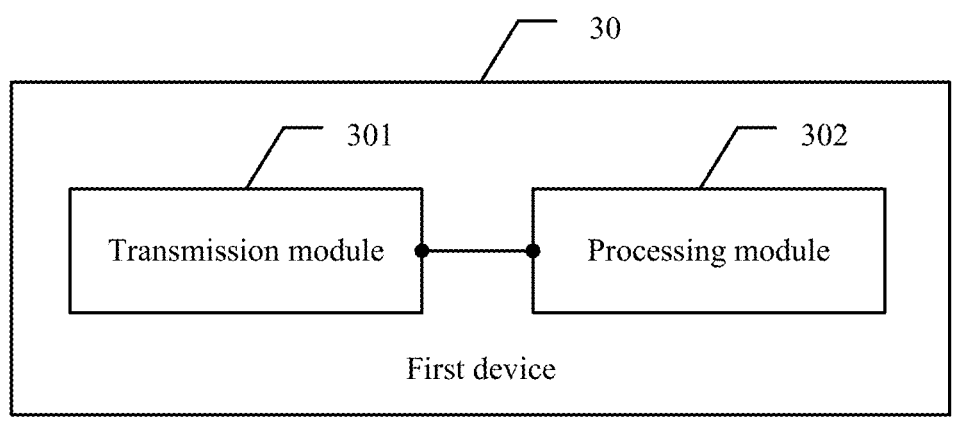
Figure 4:
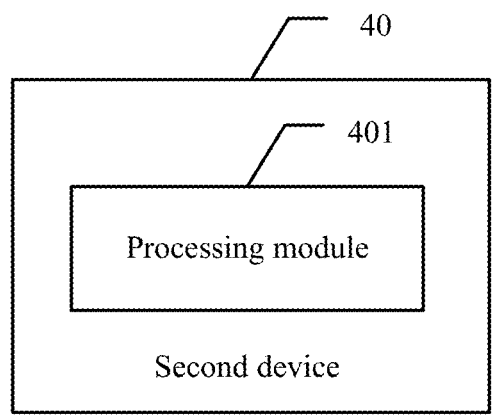
Figures 1, 4:
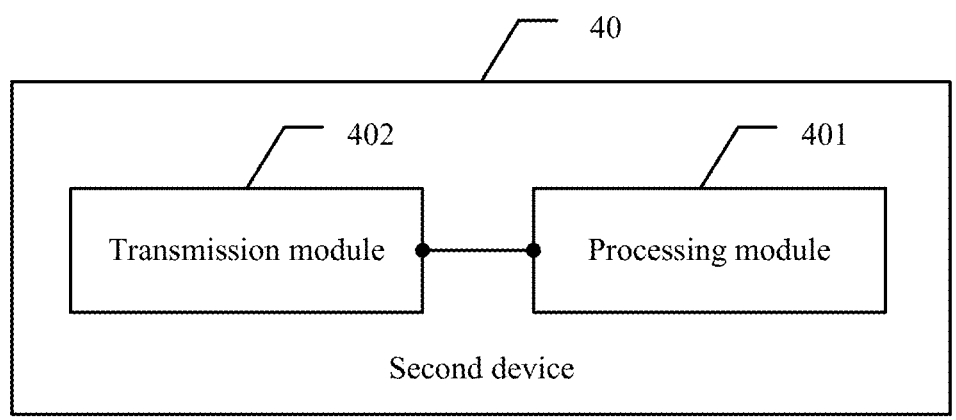
Figure 5:
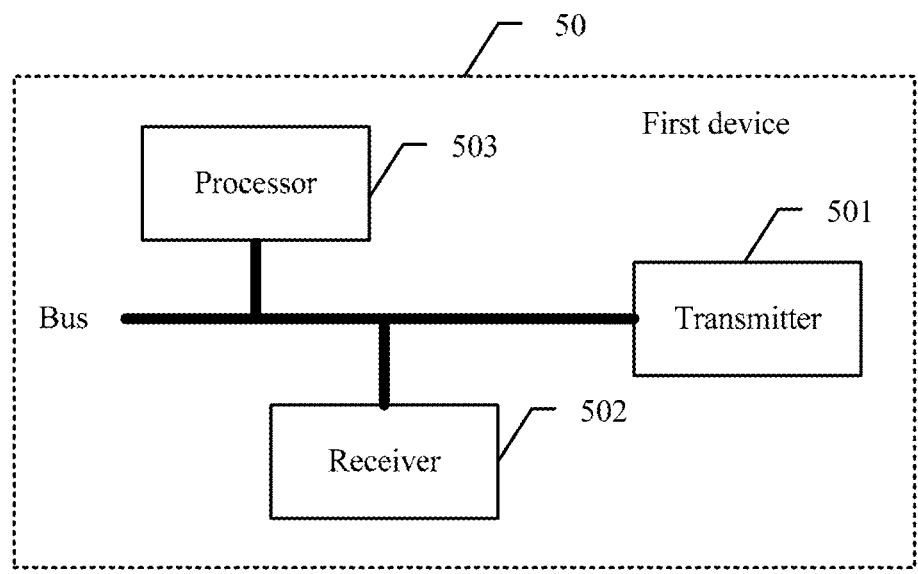
Figure 6:
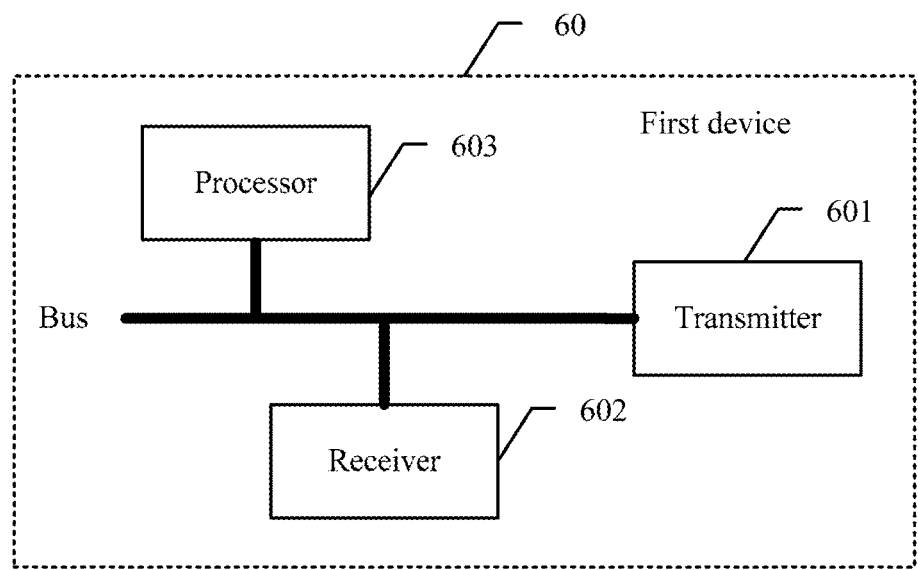

FIG. 5 is another schematic structural diagram of a first device 50 according to an embodiment of the present invention. The first device 50 may include at least one network interface or another communications interface, at least one receiver 501, at least one transmitter 502, at least one processor 503, and a memory 504, so as to implement communication connection between these apparatuses. At least one network interface (which may be wired or wireless) may implement communication connection between a system gateway and at least one other network element by using the Internet, a wide area network, a local area network, a metropolitan area network, or the like.

The memory 504 may include a read-only memory and a random access memory, and provides an instruction and data for the processor 503. A part of the memory 504 may further include a high-speed random access memory (RAM, Random Access Memory), and may further include a nonvolatile memory (non-volatile memory).

The memory 504 stores the following elements: an executable module, or a data structure, or a subset thereof, or an extended set thereof:

an operation instruction, including various operation instructions and used to implement various operations; and an operating system, including various system programs and used to implement various basic services and process a hardware-based task.

In this embodiment of the present invention, the processor 503 performs the following operations by invoking the operation instruction (the operation instruction may be stored in the operating system) stored in the memory 504:

receiving, by using the receiver 501, status information sent by all devices in the region;

determining an idle resource in a resource pool according to a transmission pattern and resources in the resource pool that are used when all the devices in the region send the status information; and determining, according to a first rule, a first transmission resource from the idle resource as a resource for sending status information of the first device, where the first rule is that the first transmission resource is not a blind area resource of a second device, the second device is a device that is adjacent to the first device in terms of a physical location and that is in all the devices in the region, and the blind area resource of the second device includes a transmission resource that corresponds to a same time domain as a transmission resource used by the second device.

Optionally, the first rule further includes:

in the region, the first device and a third device are separated by at least the second device, the third device is a device in the region that uses a blind area resource of the first device, and the blind area resource of the first device includes a transmission resource that corresponds to a same time domain as the first transmission resource.

Optionally, that the third device is a device in the region that uses a blind area resource of the first device includes:

the third device is a device in the region that has a maximum physical distance from the first device.

Optionally, a blind area resource of the first transmission resource includes a first blind area resource and a second blind area resource, the third device uses the first blind area resource, a fourth device uses the second blind area resource, and the first rule further meets one of the following conditions:

both a first distance and a second distance are not less than a first threshold, the first distance is a physical distance between the first device and the third device, and the second distance is a physical distance between the first device and the fourth device; or both a first quantity and a second quantity are not less than a second threshold, the first quantity is a quantity of devices between the first device and the third device in the region, and the second quantity is a quantity of devices between the first device and the fourth device in the region.

In some implementations, the processor 503 may further perform the following steps:

receiving, by using the receiver 501, the status information sent by all the devices in the region P times; and determining the idle resource according to the transmission pattern and the resource in the resource pool that is used when all the devices in the region send the status information P times, where P is a positive integer.

In some implementations, the processor 503 may further perform the following step:

after the transmitter 502 sends the status information of the first device according to the transmission pattern by using the first transmission resource, determining a second transmission resource that is required for sending the status information next time, and the second transmission resource and the first transmission resource correspond to different time domains.

Optionally, the transmission pattern includes N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, where ceil is a ceiling function, floor is a floor function, and round is a rounding function.

FIG. 5 is another schematic structural diagram of a second device 60 according to an embodiment of the present invention. The second device 60 may include at least one network interface or another communications interface, at least one receiver 601, at least one transmitter 602, at least one processor 603, and a memory 604, so as to implement communication connection between these apparatuses. At least one network interface (which may be wired or wireless) may implement communication connection between the system gateway and at least one other network element by using the Internet, a wide area network, a local area network, a metropolitan area network, or the like.

The memory 604 may include a read-only memory and a random access memory, and provides an instruction and data for the processor 603. A part of the memory 604 may further include a high-speed random access memory (RAM, Random Access Memory), and may further include a nonvolatile memory (non-volatile memory).

The memory 604 stores the following elements: an executable module, or a data structure, or a subset thereof, or an extended set thereof:

an operation instruction, including various operation instructions and used to implement various operations; and an operating system, including various system programs and used to implement various basic services and process a hardware-based task.

In this embodiment of the present invention, the processor 603 performs the following operations by invoking the operation instruction (the operation instruction may be stored in the operating system) stored in the memory 604:

enabling the second device to send status information of the second device by using a first transmission resource, after it is determined that a first device leaves a region and releases the first transmission resource, where the first transmission resource is a transmission resource that is used when the first device sends status information of the first device, the second device is a device in the region that is not adjacent to a device using a blind area resource of the first transmission resource in terms of a physical location, and the blind area resource of the first transmission resource includes a transmission resource that corresponds to a same time domain as the first transmission resource.

Optionally, that the second device is a device in the region that is not adjacent to a device using a blind area resource of the first transmission resource in terms of a physical location includes:

in the region, the second device and the device using a blind area resource of the first transmission resource are separated by Q devices in terms of a physical location, where Q is a positive integer.

In some implementations, when the second device is the device using a blind area resource of the first transmission resource in the region, the processor 603 may further perform the following steps:

when determining, according to status information that is of all devices except the second device in the region and that is received by the transmission module, that the first device leaves the region and releases the first transmission resource, send the status information of the second device by using the first transmission resource; or when determining, according to status information that is of all devices except the second device in the region and that is received by the transmission module, that the first device leaves the region and releases the first transmission resource, skip using the first transmission resource, so that a target device uses the first transmission resource, where the target device is a device to which an occupied transmission resource that is in a transmission pattern and that is adjacent to a location of a transmission resource used by the second device belongs, and the target device is a device that is not adjacent to the device using a blind area resource of the first transmission resource in terms of a physical location.

In some implementations, the processor 603 may further perform the following step:

That the second device is the device using a blind area resource of the first transmission resource in the region includes:

the second device is a device that is in devices using a blind area resource of the first transmission resource and that is closest to a physical location of the first device; or the second device is a device to which a frequency domain resource that is first occupied according to an order of start locations of frequency domain resources in the transmission pattern belongs.

In the foregoing embodiments, the description of each embodiment has respective focuses. For a part that is not described in detail in an embodiment, reference may be made to related descriptions in other embodiments.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The transmission resource determining method and the related device provided in the present invention are described in detail above. The principle and implementations of the present invention are described in this specification through specific examples. The embodiments are described merely for ease of understanding of the method and core ideas of the present invention. In addition, persons of ordinary skill in the art can make variations and modifications to the present invention in terms of the specific implementations and application scopes according to the ideas of the present invention. Therefore, the content of specification shall not be construed as a limit to the present invention.

What is claimed is:

1. A transmission resource determining method, wherein the method comprises:

receiving, by a first device, status information sent by all devices in a region;

determining, by the first device, an idle resource in a resource pool according to a transmission pattern and resources in the resource pool that are used when all the devices in the region send the status information; and determining, by the first device according to a first rule, a first transmission resource from the idle resource as a resource for sending status information of the first device, wherein the first rule indicates that the first transmission resource is not a blind area resource of a second device, wherein the second device is adjacent to the first device in terms of a physical location and is a device from the all devices in the region, and the blind area resource of the second device comprises a transmission resource corresponding to a same time domain as a transmission resource used by the second device.

2. The method according to claim 1, wherein the first rule further indicates:

in the region, the first device and a third device are separated by at least the second device, the third device is a device in the region that uses a blind area resource of the first device, and the blind area resource of the first device comprises a transmission resource that corresponds to a same time domain as the first transmission resource.

3. The method according to claim 2, wherein that the first rule further indicates:

the third device is a device in the region that has a maximum physical distance from the first device.

4. The method according to claim 2, wherein a blind area resource of the first transmission resource comprises a first blind area resource and a second blind area resource, the third device uses the first blind area resource, a fourth device uses the second blind area resource, and the first rule further meets one of the following conditions:

both a first distance and a second distance are not less than a first threshold, wherein the first distance is a physical distance between the first device and the third device, and the second distance is a physical distance between the first device and the fourth device; or both a first quantity and a second quantity are not less than a second threshold, wherein the first quantity is a quantity of devices between the first device and the third device in the region, and the second quantity is a quantity of devices between the first device and the fourth device in the region.

5. The method according to claim 1, wherein the receiving, by a first device, status information sent by all devices in a region, and the determining, by the first device, an idle resource in a resource pool according to a transmission pattern and resources in the resource pool that are used when all the devices in the region send the status information specifically comprise:

receiving, by the first device, the status information sent by all the devices in the region P times, and determining, by the first device, the idle resource according to the transmission pattern and the resource in the resource pool that is used when all the devices in the region send the status information P times, wherein P is a positive integer.

6. The method according to claim 1, wherein after sending the status information of the first device according to the transmission pattern by using the first transmission resource, the first device determines a second transmission resource that is required for sending the status information next time, and the second transmission resource and the first transmission resource correspond to different time domains.

7. The method according to claim 6, wherein the transmission pattern comprises N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, wherein ceil is a ceiling function, floor is a floor function, and round is a rounding function.

8. A first device, wherein the first device comprises:

a transmission module, configured to receive status information sent by all devices in a region; and a processing module, configured to: determine an idle resource in a resource pool according to a transmission pattern, wherein resources in the resource pool are used when all the devices in the region send the status information, and determine, according to a first rule, a first transmission resource from the idle resource as a resource for sending status information of the first device, wherein the first rule is that the first transmission resource is not a blind area resource of a second device, the second device is a device that is adjacent to the first device in terms of a physical location and that is in all the devices in the region, and the blind area resource of the second device comprises a transmission resource that corresponds to a same time domain as a transmission resource used by the second device.

9. The first device according to claim 8, wherein the first rule further indicates:

in the region, the first device and a third device are separated by at least the second device, the third device is a device in the region that uses a blind area resource of the first device, and the blind area resource of the first device comprises a transmission resource that corresponding to a same time domain as the first transmission resource.

10. The first device according to claim 9, wherein that the third device is a device in the region that uses a blind area resource of the first device meets the following condition:

the third device is a device in the region that has a maximum physical distance from the first device.

11. The first device according to claim 9, wherein a blind area resource of the first transmission resource comprises a first blind area resource and a second blind area resource, the third device uses the first blind area resource, a fourth device uses the second blind area resource, and the first rule further indicates one of the following conditions:

both a first distance and a second distance are not less than a first threshold, the first distance is a physical distance between the first device and the third device, and the second distance is a physical distance between the first device and the fourth device; or both a first quantity and a second quantity are not less than a second threshold, the first quantity is a quantity of devices between the first device and the third device in the region, and the second quantity is a quantity of devices between the first device and the fourth device in the region.

12. The first device according to claim 8, wherein the transmission module is specifically configured to:

receive the status information sent by all the devices in the region P times; and the processing module is specifically configured to:

determine the idle resource according to the transmission pattern and the resource in the resource pool that is used when all the devices in the region send the status information P times, wherein P is a positive integer.

13. The first device according to claim 8, wherein the processing module is further configured to:

after the transmission module sends the status information of the first device according to the transmission pattern by using the first transmission resource, determine a second transmission resource that is required for sending the status information next time, wherein the second transmission resource and the first transmission resource correspond to different time domains.

14. The first device according to claim 13, wherein the transmission pattern comprises N time domain units and M frequency domain units; and if N is greater than or equal to M, the N time domain units and the M frequency domain units form an N×M matrix; or if N is less than M, every N time domain units and every N frequency domain units form an N×N matrix, there are ceil (M/N), floor (M/N), or round (M/N) matrices in total, and transmission resources in each group of matrices that correspond to a same location in a matrix have a same permutation rule in the transmission pattern, wherein ceil is a ceiling function, floor is a floor function, and round is a rounding function.

\* \* \* \* \*